United States Patent [19]

Odaka et al.

[11] Patent Number: 4,899,232
[45] Date of Patent: Feb. 6, 1990

[54] APPARATUS FOR RECORDING AND/OR REPRODUCING DIGITAL DATA INFORMATION

[75] Inventors: Kentaro Odaka, Tokyo; Shinya Ozaki, Kanagawa; Masaki Yamada, Kanagawa; Hiroshi Ishibashi, Kanagawa; Yoshizumi Inazawa, Kanagawa, all of Japan

[73] Assignee: Sony Corporation, Tokyo, Japan

[21] Appl. No.: 177,624

[22] Filed: Apr. 5, 1988

[30] Foreign Application Priority Data

| Apr. 7, 1987 | [JP] | Japan | 62-085388 |
| Jun. 15, 1987 | [JP] | Japan | 62-148174 |
| Jun. 25, 1987 | [JP] | Japan | 62-158346 |
| Jun. 26, 1987 | [JP] | Japan | 62-158885 |

[51] Int. Cl.$^4$ ............................................... G11B 5/09
[52] U.S. Cl. ............................................ 360/48; 360/32
[58] Field of Search .............................. 360/48, 32, 13

[56] References Cited

U.S. PATENT DOCUMENTS 4,812,924  3/1989  Fukami et al. ............... 360/48

Primary Examiner—Vincent P. Canney
Attorney, Agent, or Firm—Philip M. Shaw, Jr.

[57] ABSTRACT

An apparatus for recording and/or reproducing digital data information on a recording medium which has a recorder similar to a digital audio recorder (DAT) which records digital signals in a frame made up of two oblique tracks formed by rotary heads and a controller for dividing the digital data information at a predetermined frame portion and supplying the divided information to the recorder as a digital signal, wherein since the digital data information are divided at the predetermined frame portion, they are easily re-recorded.

6 Claims, 11 Drawing Sheets

F I G. 10

| MSB | | | | | | | LSB |
|---|---|---|---|---|---|---|---|
| 0 | 0 | 1 | 0 | L | F | N | O |
| | | | L | F | N | O | |
| | | L | F | N | O | | |
| | | S | S | N | O | | |
| | | S | S | N | O | | |
| | | | F | N | O | | |
| | | | F | N | O | | |
| | | | | | | | |

| | | | | | | | |
|---|---|---|---|---|---|---|---|
| 0 | 0 | 0 | 1 | I D | | I D | |
| 0 | 0 | 0 | 0 | P | F | L | |
| | | E | C | F | L | | |
| | | E | F | N | O | | |
| FI | # | FM | | E | B | L | |
| | | E | B | L | | | |
| 0 | 0 | 0 | 0 | 0 | 0 | 0 | 0 |
| | | | | | | | |

FIG. 11A

| W1 (DATA-ID) 8bit | | W2 (Block Address) 8bit |
|---|---|---|
| ID-0 | Frame Address | 0 X X X X 0 0 0 |
| ID-1 | Optional Code | 0 ← 0 0 1 |
| ID-2 | Frame Address | 0 ← 0 1 0 |
| ID-3 | Optional Code | 0 ← 0 1 1 |
| ID-4 | Frame Address | 0 ← 1 0 0 |
| ID-5 | Optional Code | 0 ← 1 0 1 |
| ID-6 | Frame Address | 0 ← 1 1 0 |
| ID-7 | Optional Code | 0 ← 1 1 1 |

FIG. 11B

| SUB-CODE ID | | | |
|---|---|---|---|
| W1 (8 bit) | | W2 (8 bit) | |
| Validity | Location | Frame Filemark | Block Address |
| 0 | 0 0 0 | 0 * * 0 | 1 0 0 0 X X X |

APPARATUS FOR RECORDING AND/OR REPRODUCING DIGITAL DATA INFORMATION

BACKGROUND OF THE INVENTION

1. Field of the Invention

This invention relates generally to apparatus for recording and/or reproducing digital data. More particularly, the present invention relates to a rotary head type digital audio tape recorder (R-DAT) when used for recording data from a computer or the like.

2. Description of the Prior Art

In order to protect computer generated data written on a hard disc or the like, the data are sometimes transferred to a so-called data streamer (or data recorder) and are thereby recorded (or backed up) on other recording media once per day.

In most cases, a conventional data streamer is what might be called an analog audio tape recorder. Such an analog audio tape recorder, however, consumes a great quantity of the recording medium (ie. tape). Also, such a conventional data streamer has a low data rate upon recording so that it takes a lot of time for transferring and recording the data. Further, it is not easy for the analog audio tape recorder to find out the starting point of the desired recorded data.

When data from, for example, the computer is recorded on a conventional audio tape recorder, an arbitrary file mark signal is supplied thereto from the computer. Upon reproduction, the location number of the file mark for the computer designated address is searched for. Since the conventional analog audio tape recorder is so arranged as to search for the location number of the file mark by counting the reproduced signal of the file mark in the normal reproduction operation, it takes a long time to search for the desired file mark. Thus, it is difficult to search for the location number of the file mark.

A DAT (digital audio tape recorder) has been developed, as described in "ES Review", pp. 11 to 14, published on December, 1985 by Sony Corporation, Shibaura Plant: ISSN 0389-7737. Since this DAT is designed so as to record and/or reproduce a digital signal that is a digitized audio signal, it is very suitable for recording the aforesaid data.

However, generally the width of the DAT recording head is larger than the track pitch such that a portion of the preceding track is erased by the current track and data is recorded in a partially superimposed track without providing a guard band between two adjacent tracks. This will cause a problem, for example, when a portion of recorded data is reproduced, edited and recorded again. The reproducing and editing operations can be easily effected, however, it is difficult to again record the edited data.

Specifically, when data is recorded in partially superimposed tracks as set forth above, if the edited data is re-recorded, the next track in which data has been previously recorded is erased since the head width of the recording head is larger than the track width. Consequently, data to be reserved is destroyed.

To cope with the above problem, the assignee of the present invention proposed an apparatus which is capable of satisfactorily recording data information by providing an amble signal period at the beginning and end portions of each recording area in which data is recorded at one time by using the DAT (refer to Japanese Patent Application No. 61-314922) which corresponds in part with U.S. Patent Application No. 133,010 filed Dec. 15, 1987. This apparatus, however, has to re-record all the data recorded in the previous recording operation, so that if there is a large amount of data, a long period of time is necessary to reproduce and record the same.

As described above, when a conventional DAT is used as a data recorder, there is the problem that the previously recorded data cannot be easily recorded again and so on.

The data signals recorded by the DAT include an error correcting code such as a Reed-Solomon code or the like. Furthermore, because the DAT is intended to record audio signals, i.e. a more or less continuous analog signal, the data errors can be easily compensated for by interpolation techniques, such as previous value holding or the like, even if the errors cannot be corrected by the error correcting code.

However, when the DATA is used as a data recorder, data compensation by interpolation techniques such as previous value holding cannot be effected because of the discontinuous nature of digital data, so that erroneous data can no longer be reproduced unless errors are corrected by the error correcting code.

OBJECTS AND SUMMARY OF THE INVENTION

In view of the problems mentioned above, it is an object of the present invention to provide an improved apparatus for recording and/or reproducing digital data information.

It is another object of the present invention to provide an apparatus for recording and/or reproducing digital data information which employs a DAT.

It is a further object of the present invention to provide an apparatus for recording and/or reproducing digital data information which is capable of recording and/or reproducing digital data information from a computer or the like at a high speed, in a high density and with a high fidelity.

It is yet a further object of the present invention to provide an apparatus for recording and/or reproducing digital data information which allows for easy editing or modification of the recorded digital data.

It is a still further object of the present invention to provide an apparatus for recording and/or reproducing digital data information which allows the generation of error correcting codes for an arbitrary length data sequence and to smoothly record the arbitrary length of the data signals.

According to the present invention, there is proposed an apparatus for recording digital data information on a recording medium, comprising: (a) recording means for recording an inputted digital signal in one frame which is made up of two oblique tracks formed by rotary heads; and (b) control means for dividing the digital data information of each predetermined frame portion and supplying the divided digital data information to the recording means.

These and other objects, feature and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIG. 10 is tables showing a recording format of packs comprised in a subcode area;

FIGS. 11A and 11B are diagrams showing the ID organization of a DAT format; and

DESCRIPTION OF THE PREFERRED EMBODIMENTS

Figure 1:
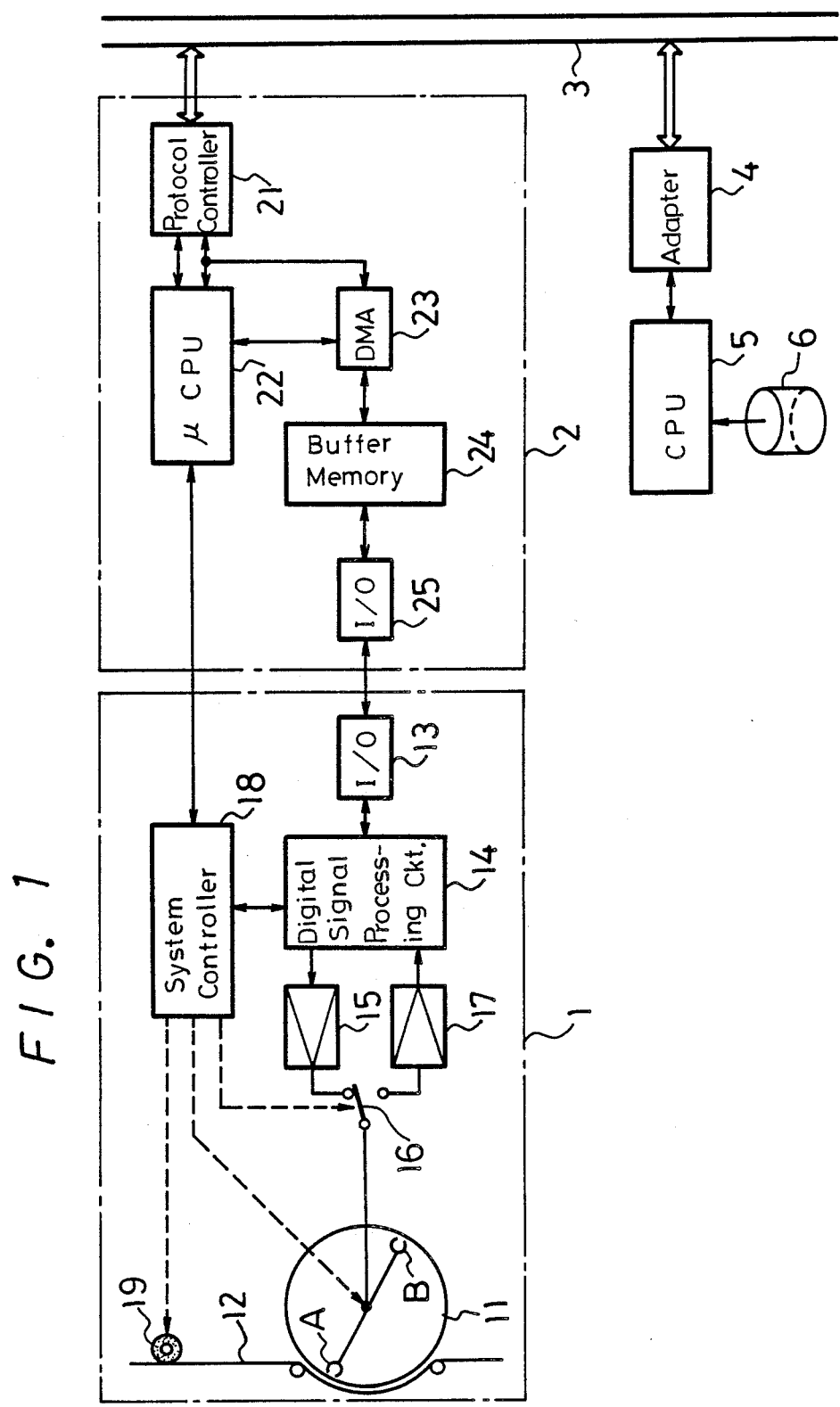
FIG. 1 is a circuit block diagram showing the whole arrangement of an embodiment of a recording and/or reproducing apparatus according to the present invention.

Referring initially to FIG. 1, the data recorder according to a first embodiment of the invention includes a digital audio tape recorder (DAT) 1. This digital audio tape recorder 1 is provided with a rotary head drum 11, and a magnetic tape 12 is wrapped around the peripheral surface of the rotary head drum 11, over an angular range of about 90° of head travel, and is transported past the head drum 11 by a tape transport mechanism 19. Two rotary heads A and B are mounted in the rotary head drum 11, and two skewed tracks are recorded and/or reproduced by the rotary heads A and B once per revolution of the rotary head drum 11 as shown more clearly in FIG. 2.

Incoming digital data is supplied to an I/O (input and output) circuit 13 of the DAT 1. The digital data from the I/O circuit 13 is supplied to a digital signal processor 14, in which it is converted into the DAT format. The digital signal converted in accordance with the DAT format is supplied through a recording amplifier 15 and a recording side contact R of a recording/reproducing change-over switch 16 to the rotary heads A and B, and is thereby recorded on the tape 12.

When the signal recorded on the tape 12 is reproduced by the rotary heads A and B, the reproduced signal is supplied through a reproducing side contact P of the recording/reproducing change-over switch 16 and a playback amplifier 17 to the digital signal processor 14, in which the reproduced signal is reconverted into the digital data and then delivered through I/O circuit 13 to the outside.

An incoming control signal is also supplied to a system control circuit 18 of the DAT 1. On the basis of the signal from the system control circuit 18, the rotary head drum 11 is controlled to rotate, tape transport mechanism 19 to run the tape 12 and the recording/reproducing change-over switch 16 to change in position. Also, upon recording, the signal from the system control circuit 18 is supplied to the digital signal processor 14 which then produces a sub-code signal or the like which will be described later. Upon reproduction, the signal extracted by the digital signal processor 14 is supplied to the system control circuit 18, whereby the tracking control operation is made and a part of this signal is fed to the outside.

In this digital audio tape recorder 1 by connecting a DA (digital-to-analog)/ AD (analog-to-digital) converting circuit to the output of the I/O circuit 13 and a predetermined control apparatus to the output of the system control circuit 18, it is possible to record and/or reproduce, for example, an analog audio signal.

In the present invention, however, an interface bus 3 is connected through a controller 2 as an external apparatus to the digital audio tape recorder 1. The interface bus 3 may be of the type which conforms, for example, to the SCSI (small computer system interface) standard (see "NIKKEI ELECTRONICS", pp. 102 to 107, published by Nihon Keizai Shinbunsha on Oct. 6, 1986). A host computer 5 and a HDD (hard disc drive) 6 are connected to this interface bus 3 through a host adaptor 4.

In the above-mentioned controller 2, a protocol control circuit 21 is connected to the interface bus 3. Through the protocol control circuit 21, the data and the control signal are interchanged among a microcomputer 22 which controls the operation of the controller 2, a memory control or DMA (dynamic memory access) circuit 23 and the bus 3. The microcomputer 22 not only controls the operation of the controller 2 but also detects the address of the DMA circuit 23 and controls the operation of the DMA circuit 23. Also, data is interchanged between a buffer memory 24 and the interface bus 3 through the DMA circuit 23. Further, data is interchanged between the buffer memory 24 and the digital signal processor 14 provided in the DAT 1 via I/O circuits 25 and 13. In addition, the control signal is interchanged between the microcomputer 22 and the system control circuit 18.

Accordingly, in this apparatus, data written in the hard disc drive 6 is supplied through the interface bus 3 to the controller 2 in response to the transfer request from the controller 2 during recording and is then written in the buffer memory 24 through the DMA circuit 23. The data written in the buffer memory 24 is read out through the I/O circuit 25 and then fed to the digital audio tape recorder (DAT) 1. In the digital audio tape recorder 1, the data inputted to the I/O circuit 13 is regarded as being equivalent to that derived from the A/D converting circuit when the audio signal is recorded. Thus, this data is converted in accordance with a predetermined DAT format by the digital signal processor 14 and is thereby recorded on the tape 12 by the rotary heads A and B.

Upon reproduction, the signal reproduced from the tape 12 by the heads A and B is reconverted buy the digital signal processor 14 and thereby data corresponding to the audio signal is produced. This data is supplied through the I/O circuit 13 to the controller 2. In the controller 2, the data written in the buffer memory 24 through the I/O circuit 25 is read out through the DMA circuit 23 and then written in the hard disc drive 6 through the interface bus 3.

During the recording operation, the host computer 5 transmits data signals, for example, at a unit rate of $2^n$ (for example 512) bits to the DAT 1. Therefore, the data stored in the buffer memory 24 is supplied to the digital signal processing circuit 14 such that an integer multiple of $2^n$ bits of data are recorded in one frame which is made up of two oblique tracks formed by one rotation of the drum 11 (refer to Japanese Patent Application No. 61-303080).

In this recording mode, the reading of the buffer memory 24, for example, is controlled in a manner that one to several frame portions of meaningless data are recorded every time a predetermined number of frames of data are recorded on the tape.

Figure 2:
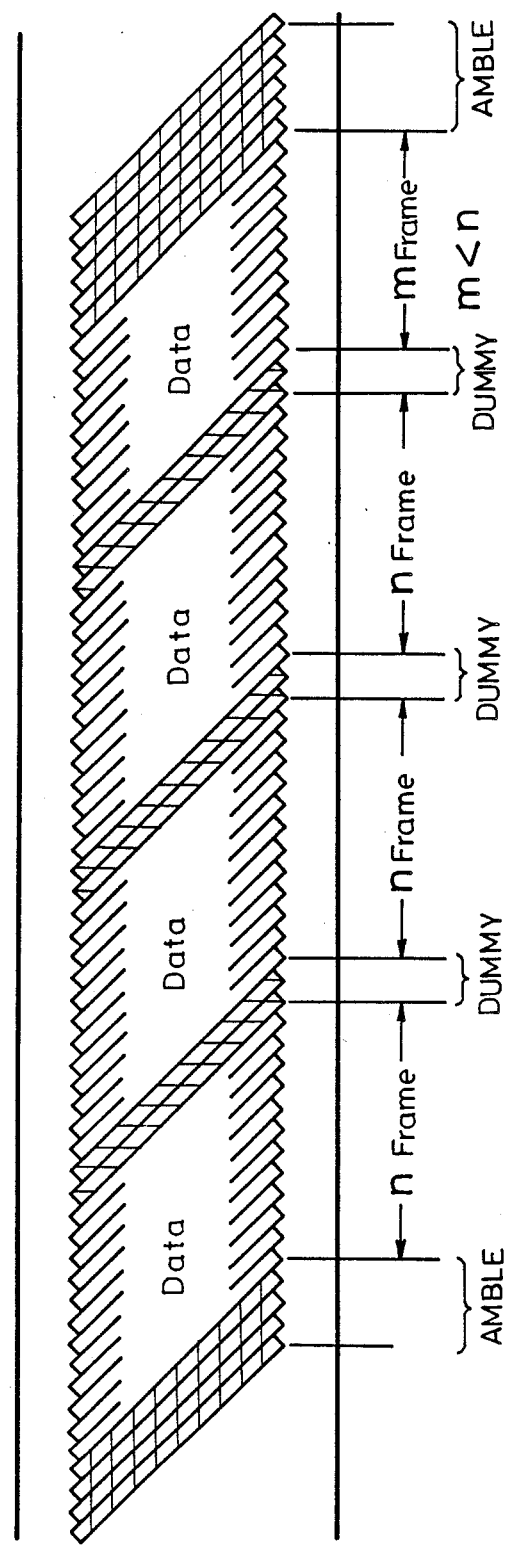
FIGS. 2 and 3A to 3C are diagrams respectively showing an example of a recording pattern made on a recording medium by the recording and/or reproducing apparatus according to the present invention.
Figures 3A, 3B, 3C:
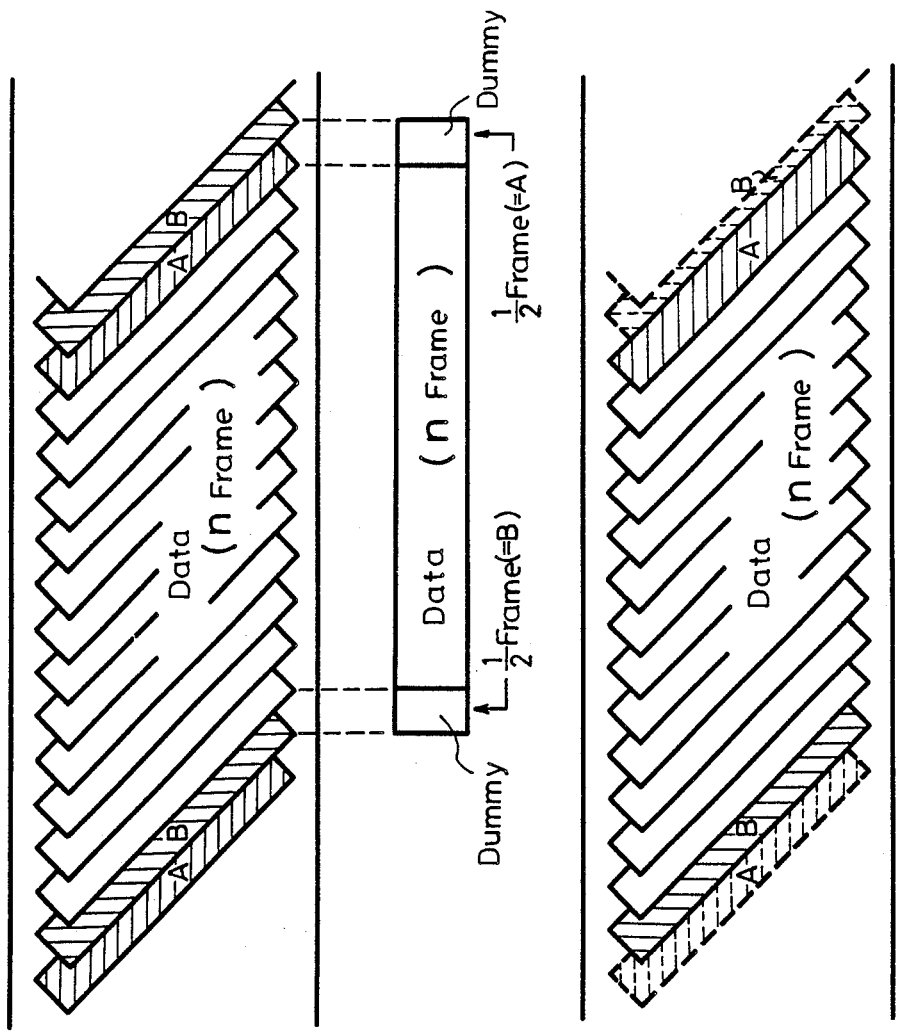

This recording mode will be described in detail with reference to FIG. 2 which shows the entire data recorded at one time in the recording operation. First, a plurality of frames of the amble signals are (shown as hatched marked tracks) recorded from the beginning (the left side in relation to FIG. 2) of the tape, and subsequently n frames of data signals are recorded after the amble signals. Then, for example, one frame of a meaningless dummy signal is (shown as hatched marked tracks) recorded after the n frames of the data signals. The n frames of the data signals and one frame of the dummy signal are repeatedly recorded. Finally, the remaining m ($m<n$) frames of the data signals are recorded, and a plurality of the amble signals are thereafter recorded. FIG. 3A shows in detail how the data signals are recorded between the dummy signals, wherein a period for recording n frames of the data signals is provided after one frame of the dummy signals (shown by hatchings) recorded by the heads A and B of the rotary head drum 11, and another frame of the dummy signals is provided after the data signal recording period. The desired data signals between the two dummy signal recording periods are extracted by the use of a timing signal such as, for example, a signal which is indicative of the frame number, or the like, contained in the data signal during reproduction.

When the data signals are re-recorded after they have been subjected to processing, such as editing or the like, under the condition that the rotary phase servo or the like of the drum 11 is effected in advance of the tape location where the data signals to be re-recorded are recorded, the latter half of the dummy signals by the head B are recorded first, and then n frames of the data signals are next recorded, and the dummy signal is only recorded by the head A, as shown in FIG. 3B. Thus, the re-recording is ended.

With this process, a re-recording operation is accomplished as shown in FIG. 3C. At the end portion of the re-recording, a portion of the track previously recorded by the head B is erased by the head A having a width wider than the track width, however, since the erased track has only the dummy signals recorded thereon, no problem will occur.

As described above, the data signals recorded between the dummy signal frames can be arbitrarily re-recorded, so that editing, modification and so on of the recorded data signal can be easily carried out.

The number n of frames of the data signals to be recorded between the dummy signal frames may be determined from the number of tracks to be recorded. Apart from this, when the data signals are repeatedly recorded upon the occurrence of recording errors, for example, as the assignee of the present invention has previously proposed in Japanese Patent Application No. 62-4434, the number n may be selected to be a substantial number of the frames which have been recorded.

Generally, one frame of the dummy signal is sufficient. However, if there is a fear that errors may be increased during re-recording while the data signals are repeatedly recorded as described above, a plurality of frames of the dummy signals may be provided, taken in consideration of the above increased amount.

Further, in this case, the number of tracks maximally required to record substantially n frames of the data signals is calculated from an assumed error occurring ratio or the like based on the recording medium, and then the number of tracks between the dummy frames may be set as this number. This method allows the recording position of the dummy signals to always be constant on the recording medium. Therefore, by determining the frame period in which the amble signals are recorded to be a period which is detectable by a high speed search operation or the like, a desired recording portion can be taken out from the tape on the basis of its distance after the detection.

As described above, according to this embodiment, since one to several frames of the meaningless data are recorded every time a predetermined number of frames of the digital signals are recorded, if the meaningless data frames are also recorded upon the re-recording of the data signals, the re-recording can be smoothly carried out without destroying any part of the necessary data signals. Thus, it is possible to provide a satisfactory data recorder equipped with a DAT.

Next, a second embodiment of the present invention will be described with reference to FIG. 4. The parts in FIG. 4 corresponding to those in FIG. 1 are designated using the same reference numerals and a detailed explanation thereof will be omitted.

Figure 4:
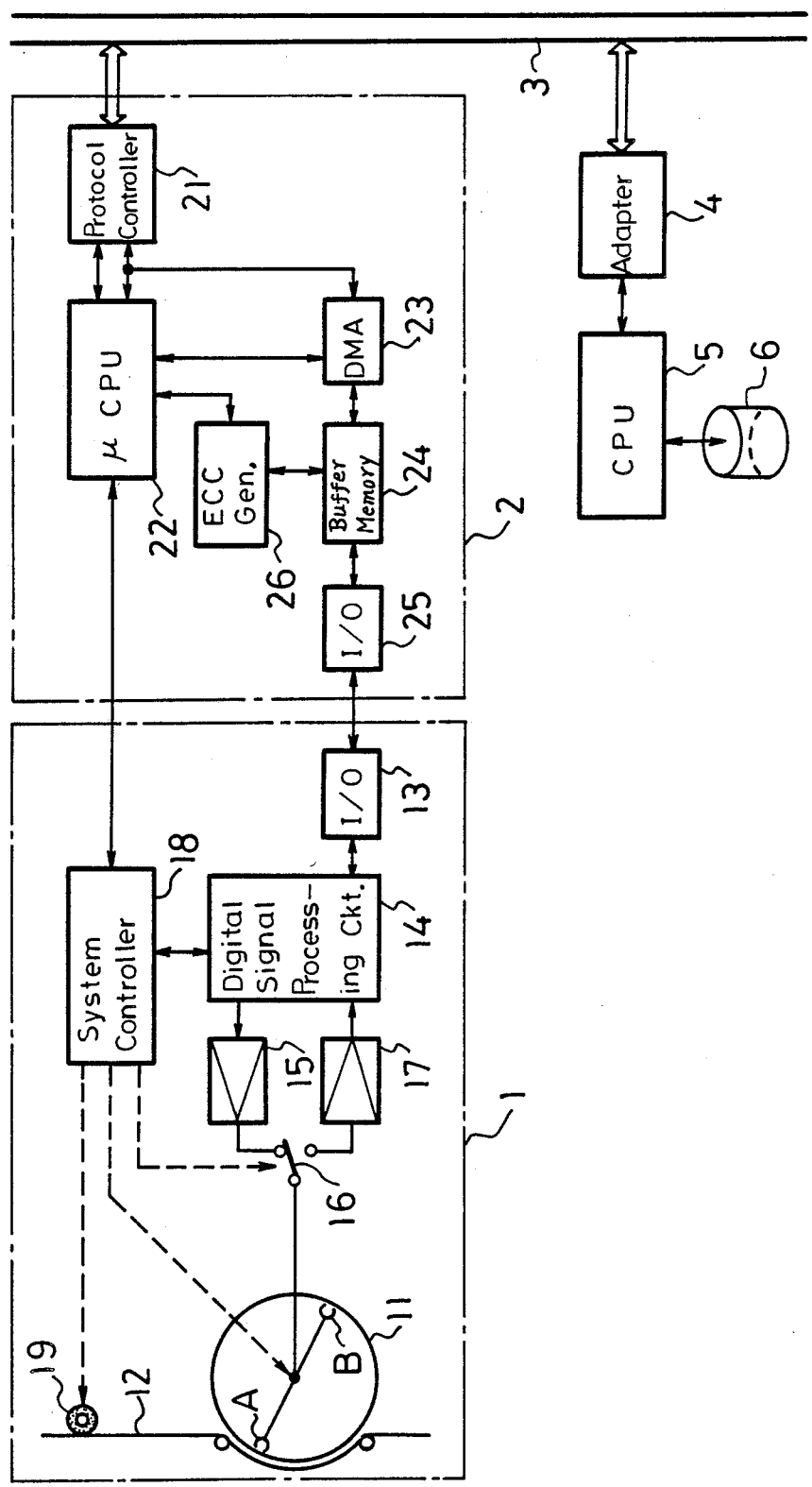
FIG. 4 is a circuit block diagram showing the whole arrangement of another embodiment of a recording and/or reproducing apparatus according to the present invention.

As with the embodiment depicted in FIG. 1, the controller 2 of FIG. 4 is provided with the protocol controller 21 which is connected with the bus 3. The microcomputer 22 for controlling operations of the controller 2 and the memory controller (DMA) 23 communicate data and control signals with the bus 3 through the protocol controller 21. The microcomputer 22 detects conditions of the DMA 23 and controls the operations of the same, while the buffer memory 24 communicates with the bus 3 through the DMA 23.

In this embodiment, however, the memory 24 is provided with an error correcting code (ECC) generating circuit 26 which generates an error correcting code for the data which is stored in the buffer memory 24. This error correcting code is also stored in a predetermined area of the buffer memory 24.

The buffer memory 24 communicates with the processing circuit 14 of the DAT 1 through the I/O circuits 13 and 25. Also, the microcomputer 22 communicates with the system controller 18 of the DAT 1 similarly as in the embodiment shown in FIG. 1.

With the construction shown in FIG. 4 and described above, the data stored in the hard disk unit 6 is supplied to the controller 2 through the bus 3 in response to a transmission request made by the controller 2 and stored in the buffer memory 24 through the DMA 23 upon recording. The ECC generating circuit 26, under the control of the microcomputer 22, generates the error correcting code for the data stored in the buffer memory 24. The data including the error correcting code is next read out of the buffer memory 24 and supplied to the DAT 1 through the I/0 circuit 25.

In the DAT 1, the data supplied to the I/0 circuit 13 is processed by the digital signal processing circuit 14 in the same manner as audio data from an A/D converter and converted to the predetermined DAT format and then recorded on the tape 12 by the heads A and B.

The DAT format is such that 5760 bytes of original data can be recorded in one frame which is made up of two oblique tracks formed by one rotation of the drum 11. For the case in which one unit is formed of 12 frames, 11 frames are each used to record 5760 bytes of data therein while the remaining one frame is used to record only 2176 bytes of data. The remaining bytes are of invalid data. In this manner, 65536 bytes (64 Kbytes) can be recorded in the above-mentioned one unit (12 frames).

When 64 Kbytes of data have been stored in the buffer memory 24, the ECC generating circuit 26 generates the error correcting code. For this error correcting code, a Reed-Solomon code is employed. The 12-frames of data are provided, for example, with a two-frame portion of the error correcting code. The generated error correcting code is stored in a predetermined area of the buffer memory 24.

During recording, the buffer memory 24 is controlled by the microcomputer 22 in such a manner that first one frame portion of the error correcting code, then 12 frame portions of data signals, and finally one frame portion of the error correcting code are read out of the buffer memory 24 to the I/O devices 25, 13 and are recorded by the heads A and B.

Figures 5A, 5B, 5C:
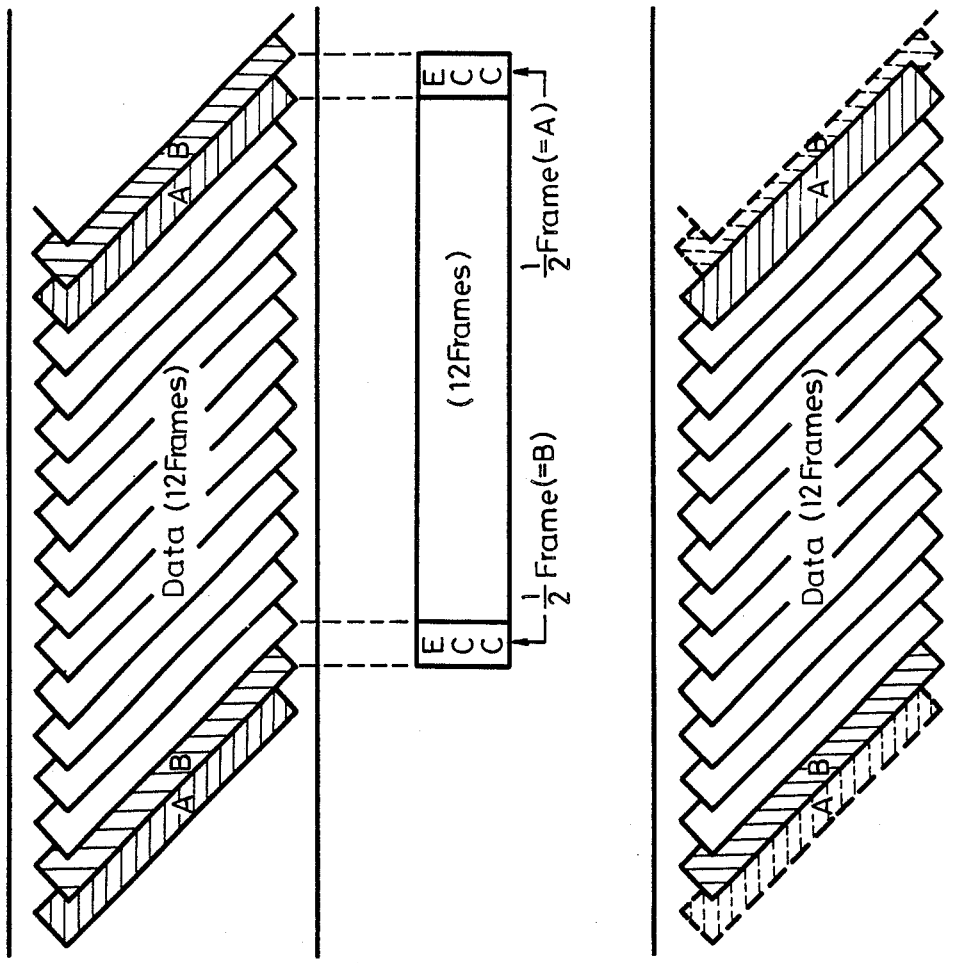
FIGS. 5A to 5C and 6 are diagrams respectively showing another example of a recording pattern made on a recording medium by the recording and/or reproducing apparatus according to the present invention.

Thus, a recording pattern made on the tape 12 is as shown in FIG. 5A wherein one frame of the error correcting code (ECC) signal is located ahead of 12 subsequent frames of data signals (a part of which are omitted in the drawing) and another frame of the ECC signal, which are respectively recorded by the heads A and B mounted on the rotary drum 11. Upon reproduction, the desired data signals located between the ECC frame are taken out by the use of a timing signal such as a signal indicative of the frame number or the like contained in the data signals.

Assume now that the data signals are to be re-recorded again after processing such as editing or the like has been effected thereon, under the condition that the drum 11 is servo-controlled by, for example, a rotating phase servo or the like, from a tape location before the data signals are to be re-recorded are recorded. Under such conditions, the latter half of the ECC signal in the ECC frames originally recorded by the head B is first recorded, 12 frames of the data signals are next recorded, and only the ECC signal originally recorded by the head A is recorded as shown in FIG. 5B. Then, the re-recording is ended.

With the process described above, the re-recording is accomplished as shown in FIG. 5C. It can be seen from FIG. 5C that one frame portion of the ECC signal has been deleted by the re-recording. Although upon reproduction, the error correcting ability is a bit degraded by this deletion of the ECC signal, since the data signals are preserved, no problem will occur in ordinary use.

As described above, the apparatus according to the second embodiment allows arbitrarily recording the data signals located between the ECC frames, so that editing, modifying and so on can be easily carried out for the recorded data signals.

Incidentally, when k frames of the error correcting codes are provided for the data signals, it is possible to correct errors occurring in up to k frames of the data signals. Therefore, when a read after write head is used to check errors in recorded data signals, the data signals can be recorded while errors occurring in up to k frames are ignored. Therefore, a procedure of repeatedly recording the data signals, for example, when errors occur during recording can be largely simplified.

If errors occur in more than k frames of the data signals, the entire block of the data signals between the ECC frames may be repeatedly recorded. Since the data signals are divided into sufficiently small blocks by the ECC frames, it is easy to repeatedly record the data signal block.

The value k should be replaced with k−1 upon the first re-recording.

Further, an ID code, indicative of the number of the re-recording may be inserted, for example, in each frame so as to prevent erroneous detection of the ECC frame which remains unerased in the preceding re-recording. With such an ID code, it is possible to ignore frames except for the frame that has the same value as the number of the re-recording.

Also, by using a data sequence which can be interleaved between the respective tracks as the data used for generating the error correcting code, it is possible to improve the error correcting ability for errors caused by horizontal scratches or the like on the tape.

Further, in the second embodiment, it is possible to provide a sufficient number of the ECC frames such that the ECCs are recorded in all of the provided ECC frames for a high grade apparatus or the ECCs are recorded only in a portion of the ECC frames and meaningless data is recorded in the remaining portion for a low grade apparatus.

According to the apparatus of the second embodiment, as described above, during recording, one to several frames of the error correcting code are recorded in place of the dummy signals every time a predetermined number of frames of the data signals are recorded, so that the error correcting ability can be largely improved. The ECC frames are also recorded upon re-recording so that necessary data signals can be re-recorded smoothly without being destroyed, to thereby provide a satisfactory data recorder which employs a DAT.

Reference is next made to how, in actual practice, the error correcting code is recorded in the corresponding frames in the recording operation by way of example.

Figure 6:
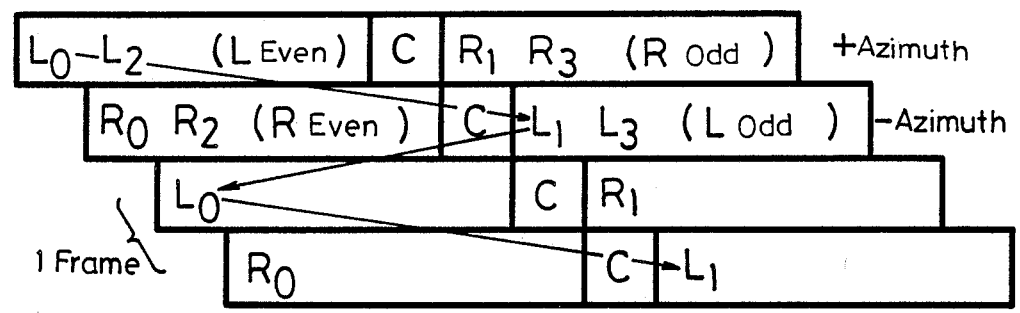

The DAT format is, as shown in FIG. 6, such that data is interleaved in one frame which is made up of two oblique tracks formed by one rotation of the drum 11, in a manner that even-numbered data of the left channel is recorded in the former half of one track (plus azimuth) of the one frame and odd-numbered data of the right channel is recorded in the latter half of the same track, while even-numbered data of the right channel is recorded in the former half of the other track (minus azimuth) of the same frame and odd-numbered data of the left channel is recorded in the latter half of the same track. Reference letter "C" written in the center of each track in FIG. 6 represents the error correcting code added to each track by the DAT 1. In generating the error correcting code, 2n'th (even-numbered) data and (2n+1)'th (odd-numbered) data of each frame are taken out to form a data sequence, to thereby generate the error correcting code to be recorded in the error correcting code frame for the interleaved data sequence on the tape 12.

An error correcting code generating matrix is arranged for the data sequence, for example, as follows:

| 1 | ... | 1 | 1 | | 1 | 1 | 1 | 1 |
|---|---|---|---|---|---|---|---|---|
| $\alpha^{254}$ | ... | $\alpha^5$ | $\alpha^4$ | | $\alpha^3$ | $\alpha^2$ | $\alpha^1$ | 1 |
| $\alpha^{508}$ | ... | $\alpha^{10}$ | $\alpha^8$ | | $\alpha^6$ | $\alpha^4$ | $\alpha^2$ | 1 |
| $\alpha^{762}$ | ... | $\alpha^{15}$ | $\alpha^{12}$ | | $\alpha^9$ | $\alpha^6$ | $\alpha^3$ | 1 |

Figure 7:
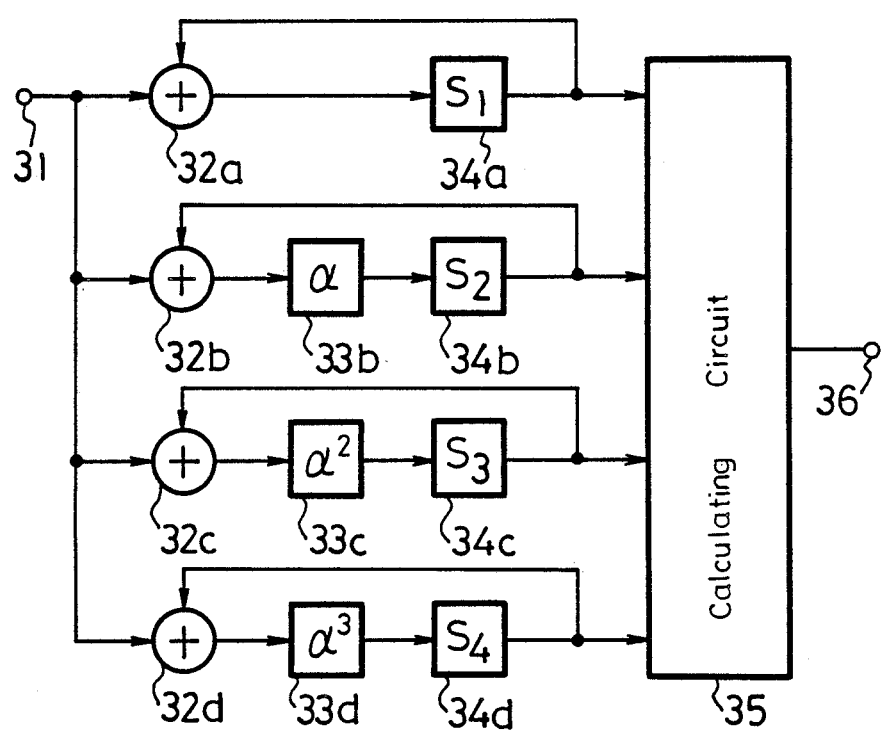
FIG. 7 is a circuit block diagram showing an example of a syndrome generating circuit.

A syndrome generating circuit is formed for the matrix thus generated, for example, as shown in FIG. 7. Specifically, a data signal fed to a terminal 31 on the left side of the drawing is supplied to adder circuits 32a–32d. The output signals from the adder circuits 32a–32d are respectively supplied to syndrome registers 34a–34d directly and through coefficient circuits 33b–33d respectively having a coefficient of $\alpha$, $\alpha^2$ and $\alpha^3$. The signals outputted from the syndrome registers 34a–34d are respectively fed back to the adder circuits 32a–32d. Thus, syndromes are generated in the registers 34a–34d by the feedback which are effected every time the data signal is supplied to the adder circuits 32a–32d.

Therefore, every time the data signal is fed to the terminal 31, calculation is effected from the right side of the data section of the above matrix. Generally, at the time, for example, 251 symbols of data are supplied, the syndromes are generated from the registers 34a–34d. The syndromes thus generated are supplied to a calculating circuit 35, which corresponds to the parity section of the above matrix, to generate a 4-symbol error correcting code. If the data sequence is terminated while the calculation is progressing, the registers 34a–34d respectively generate the syndromes equivalent to the fact that zero is supplied to all the elements of the syndromes located on the left side from the point the calculation based on the data sequence has been effected. Then, at this time, the registers 34a–34d are made inoperative and the respective contents thereof are supplied to the calculating circuit 35, to thereby generate the error correcting codes for the data which has been supplied to the syndrome generating circuit up to that time.

By this processing, the error correcting code can be smoothly generated and added to an arbitrarily variable length of data sequence. In this case, the above-mentioned syndrome generating circuit is realized in practice by software of a microcomputer or the like. The required hardware is solely memory areas corresponding to the syndrome registers 34a–34d so that the apparatus can be realized by a simple construction. That is, the memory capacity of each of the registers 34a–34d is four times the data amount for one track so that it will be understood that the syndrome generating circuit can be easily constructed with an extremely small memory capacity and a properly programmed microcomputer.

Figure 12:
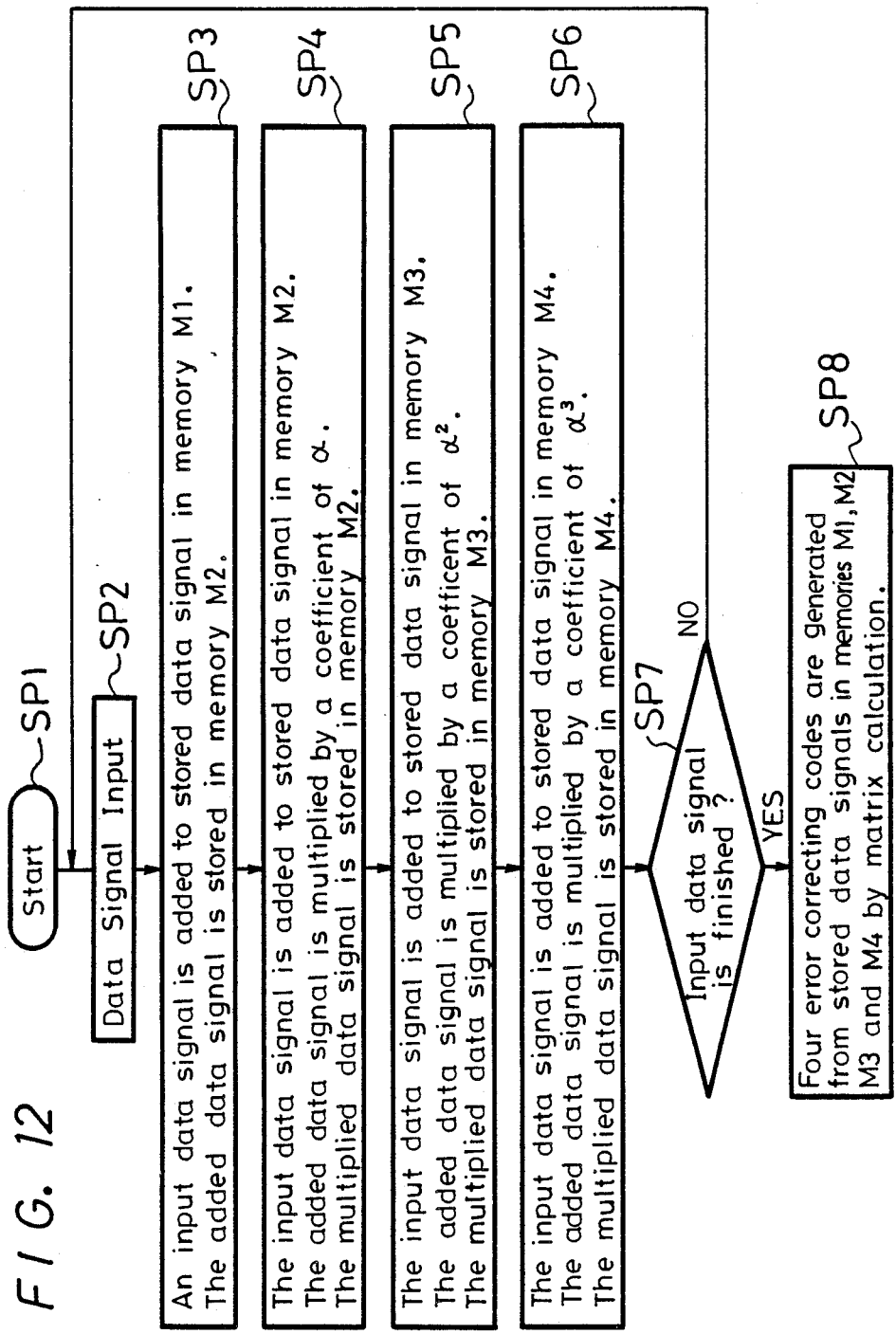
FIG. 12 is a flow chart illustrating a program for generating syndromes for use in error correction.

Referring now to FIG. 12, a flow chart for such a syndrome generating program is illustrated. The program starts at step SP1 and the data signal is input at step SP2. At step SP3, the input data signal is added to the stored data signal in memory M1 (within memory unit 24) and the added data signal is stored in memory area M2 of buffer memory 24.

The input data signal, at step SP4, is added to the stored data signal in the memory area M2. The added data signal is multiplied by a coefficient of $\alpha$. The multiplied data signal is stored in memory area M2. In step SP5, the input data signal is added to the stored data signal in memory area M3 of the buffer memory 24, the added data signal is multiplied by a coefficient of $\alpha^2$. The multiplied data signal is stored in memory area M3.

Next, the input data signal is added to the stored data signal in memory area M4 of the buffer memory area 24. The added data signal is multiplied by a coefficient of $\alpha^3$. The multiplied data signal is stored in memory area M4 at step SP6. At step SP7 it is determined whether or not the input data signal is finished. If the answer is no, the process returns to step SP2. If the answer is yes, the process goes to step SP8 where four error correcting codes are generated from the stored data signals in the memory areas M1, M2, M3 and M4 by matrix calculations. This ends the process.

The generated error correcting code is supplied to the DAT 1 subsequent to the data signals so as to smoothly record an arbitrarily variable length of the data signals, thereby rendering it possible to provide a satisfactory data recorder which employs the DAT.

In the above described embodiment, since two symbols are taken out from each frame of the data sequence for generating the error correcting code, the generated 4-symbol error correcting code can be recorded in two frames (four tracks).

If, as a particular example, the error correcting code is assumed to be formed of two symbols, the following matrix, for example, may be used:

| 1 | ... | 1 | | 1 | 1 | 1 |
|---|---|---|---|---|---|---|
| $\alpha^{254}$ | ... | $\alpha^2$ | | $\alpha$ | 0 | 1 |

With this matrix, the calculating circuit 35 becomes unnecessary.

Next, an explanation will be given of how error correcting processing is carried out during reproduction by the aforementioned apparatus with reference to FIGS. 8A to 8E.

Figure 8:
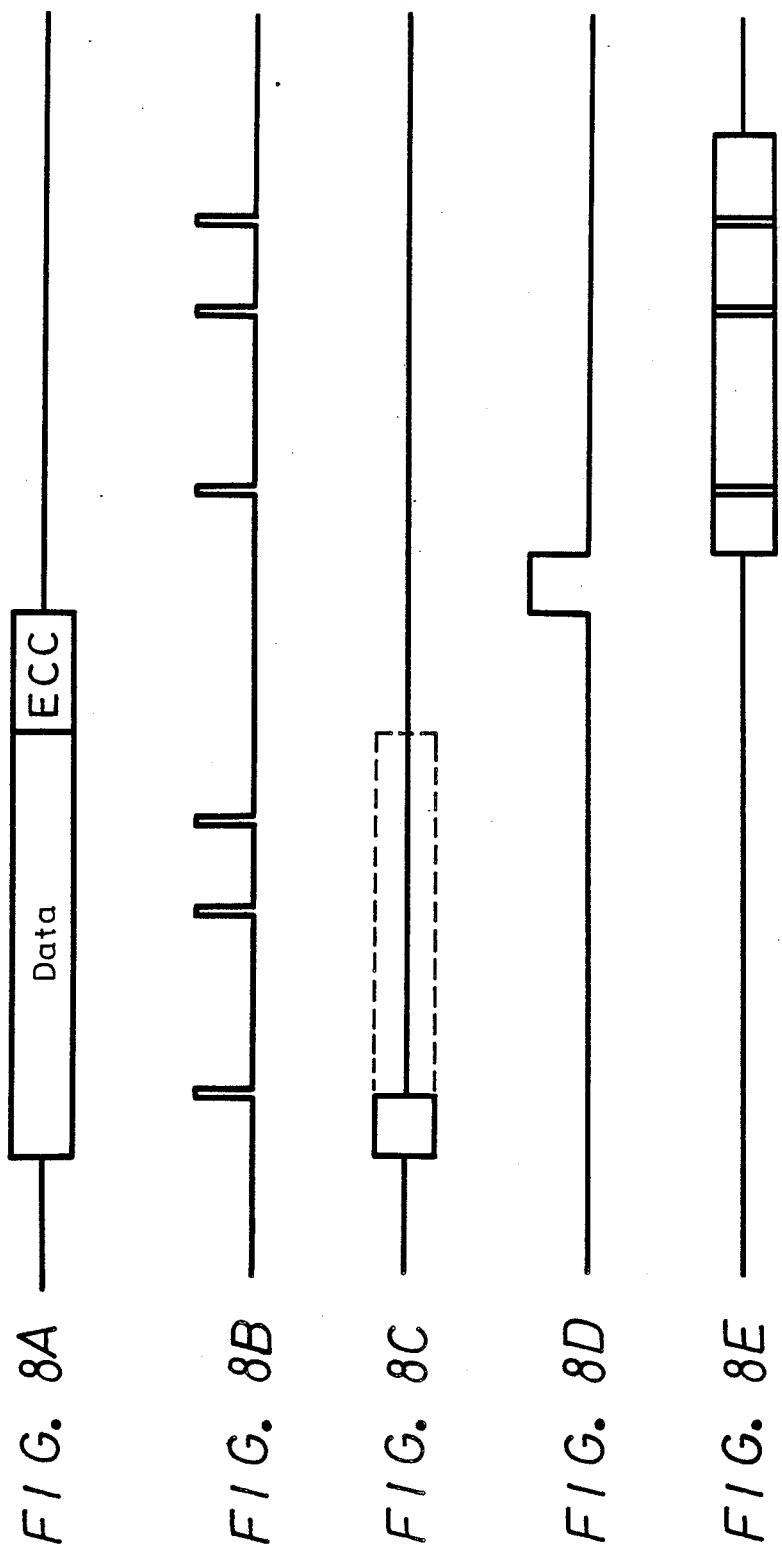
FIGS. 8A to 8E are timing charts used for explaining the operation of the reproducing apparatus according to the present invention.

First, the data signals and the error correcting code (ECC) are reproduced as shown in FIG. 8A. If the DAT 1 detects that there is a frame whose error can not be corrected as shown in FIG. 8B, a condition where the data has been directly outputted at first is halted as shown in FIG. 8C. However, at this time the data signals are continuously supplied to the syndrome generating circuit, so that the syndrome generating circuit generates data for correcting errors in the erroneous frame at the time the reproduction of the error correcting code has been terminated. From this condition, the DAT 1 is instructed to rewind the tape as shown in FIG. 8D. Then, as shown in FIG. 8E the DAT 1 again starts the reproduction of the data signals from the beginning thereof, in which the error correcting data generated by the syndrome generating circuit is inserted for the detected erroneous frame and then the whole data signals are reproduced.

When no error is found in the data frames as usual, the data signals are reproduced as they are and outputted to the bus 3 without any other processing. The above described processing is effected only when errors are found in the data frames, so that the data signals as a whole can be quite rapidly reproduced.

The above described error correction can be effected with only a small capacity of the memory area corresponding to the syndrome registers 34a–34d by using the data signals again reproduced from the DAT 1, without the necessity of providing a large capacity buffer memory for storing all data in the data section of the foregoing matrix and so on.

The error correction as described above requires, upon reproduction, detecting at least the frame number of the error correcting code and discriminating whether the frame contains the data signals or the error correcting code. Therefore, a signal area is reserved in the DAT format for such detection and discrimination. This DAT format, in accordance with which the data signals are recorded on the tape 12, will be explained with reference to FIG. 9.

Figure 9:
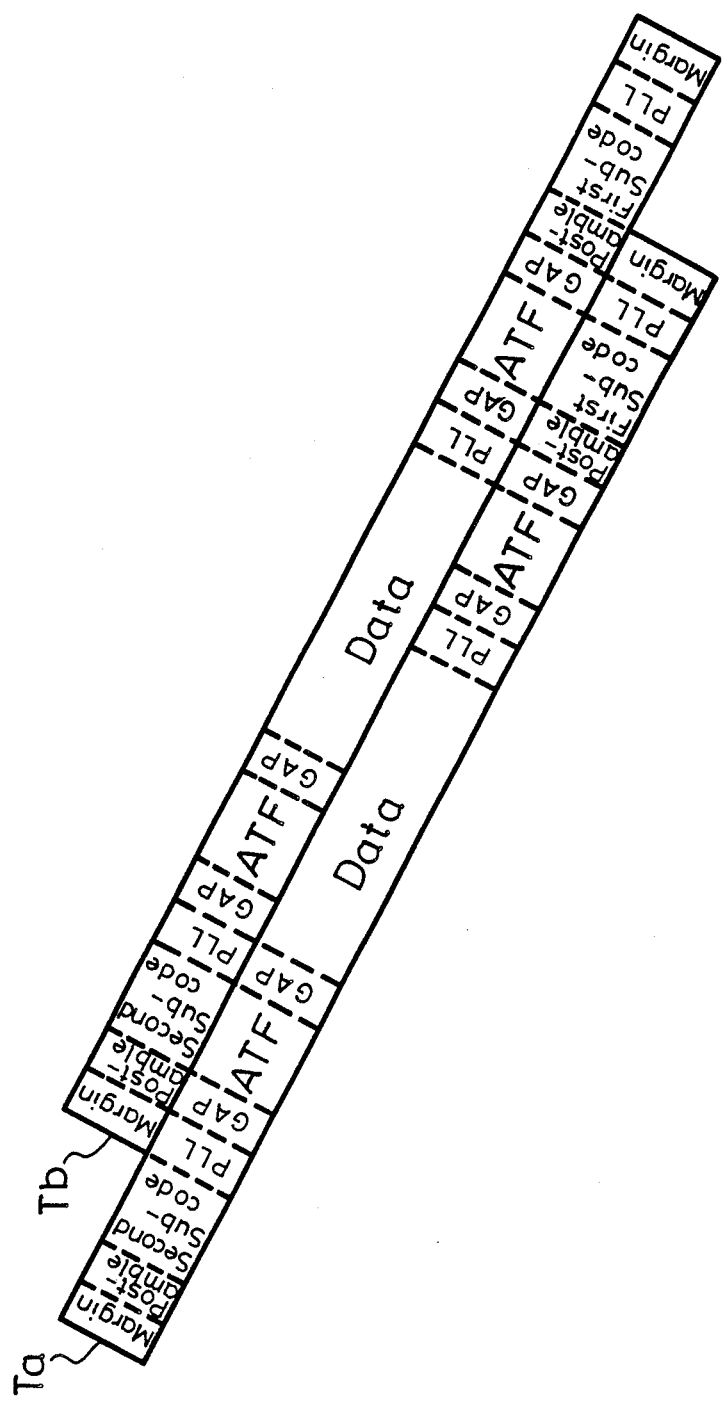
FIG. 9 is a diagram showing a DAT format.

As can be seen from FIG. 9, one frame is made up of two tracks Ta and Tb formed by the heads A and B. Each of the tracks Ta and Tb has a length corresponding to the rotation of each of the respective heads through an angle of 90° and is partitioned from its lower end (i.e. from right to left in the figure) into 5.051° of a margin area, 0.918° of a preamble area for the PLL of the sub-code, 3.673° of a first sub-code, 0.459° of a postamble area, 1.378° of an interblock gap area, 2.296° of a tracking (ATF) signal area, 1.378° of an interblock gap area, 0.918° of a preamble area for the PLL of data, 58.776° of data area, 1.378° of an interblock gap area, 2.296° of an AFT signal area, 1.378° of an interblock gap area, 0.918° of a preamble area for the PLL of the sub-code, 3.673° of a second sub-code area, 0.459° of the postamble area, and 5.051° of the margin area. It should be noted that the scale of the respective areas in FIG. 9 is not exact.

Data fed to the DAT 1 at the I/O circuit 13 is supplied to the processing circuit 14 which adds predetermined error detecting and correcting codes and so on to the data and then inserts it into the data areas of the tracks Ta and Tb in accordance with a predetermined interleaving relationship.

As illustrated in FIG. 11A, the data area comprises an 8-bit synchronizing section at its starting portion and subsequently totals 16 bits of ID section formed of W1 and W2. The ID section is divided into eight ID areas of two bits. The first ID area (ID-0) is assigned to a format ID and set to "01" for a data specification, for example. The next ID area (ID-1) is assigned to a sub-category ID and set to "00" for a computer peripheral device, for example. The next ID area (ID-2) is assigned to a frame size ID and set to "00" when the recording capacity of the frame is 5760 bytes and "01" when the recording capacity of the same is 5292 bytes, for example. The ID area (ID-3) is assigned to a track pitch ID and set to "00" when the track pitch is 13.6μm and "01" when the track pitch is 20.4μm, for example.

As illustrated in FIG. 11B, the sub-code area also comprises an ID section formed of W1 and W2. The first bit of W1 is assigned to a code indicative of validity (set to "1") or invalidity (set to "0") of data. The next three bits of W1 are a code indicative of a location of an area including a frame. Specifically, this code is set to "000" when the area is located at a read-in area, that is, the beginning of a tape, "001" when in the data area, "010" when in a read-out area, that is, the end of a data recording area, "011" when at the end of medium, that is, the end of the tape. The remaining four bits of W1 is assigned to a code indicative of an ordinary frame (set to "00"), an amble frame used for synchronization or the like (set to "01"), a frame other than a file mark (set to "000*"), a first file mark (set to "001*"), a second file mark (set to "010*"), or a third file mark (set to "011*"). On the other hand, W2 has its first bit set to "1", the next three bits set to "000" which indicates that the following sub-code is a pack format, as will be later referred to, and the last four bits set to a value indicative of a block address.

A variety of determinations can be carried out by means of the above-mentioned information when the DAT is used as a data recorder.

The first and second sub-code areas respectively have a capacity capable of recording 2048 bits of data. According to the DAT format for audio signals, 2048 bits are divided into 64-bit packs, each of which is used to record therein information such as the time code of the recorded signal, the recording date and so on.

It is possible to use the packs for recording information on the data recorder, whereby a variety of control operations can be effected by the use of a pair of the packs. FIG. 10 shows formats of the packs for the control operations. As is apparent from the tables in FIG. 10, each pack of 64 bits is divided into eight words each comprising eight bits. The upper four bits of the top or first word of each pack is assigned to an ITEM area which, common to the recording format for audio signals, shows the contents of the pack by its four binary codes. Nine of the 16 combinations made by four bits have already been assigned for audio signal recording, so that the indication of the data recorder is arbitrarily selected from the remaining seven combinations, for example, the ITEM area of the first pack of the two packs in use is set to "0010" and that of the second pack to "0001".

A total 20-bit area made up of the lower four bits of the first word and the second and third words of the first pack is assigned to a logical frame number (LFNO) area in which is recorded, for example, a binary-code combination indicative of the serial number of a valid frame from the head of the tape.

A total 16-bit area made up of the fourth and fifth words of the first pack is assigned to a save set number (SSNO) area in which is recorded, for example, a binary-code combination indicating how many times the backup has been carried out from the initial use of the apparatus.

An area made up of the sixth and seventh words of the first pack is assigned to a file number (FNO) area in which is recorded a binary-code combination indicative of the serial number of a file within the whole files of data backed up (saved) at one time.

The eighth word of the first pack is assigned to a parity for the first to seventh words.

A total 20-bit area made up of the lower four bits of the first word and the second and third words of the second pack is assigned to indicate frame conditions. Specifically, the upper two bits of the upper four bits of the first word are set to a code indicative of the aforementioned amble area (set to "00"), data area (set to "01"), read-out area (set to "10"), or end of medium (set to "11"), while the lower two bits of the same are set to a code indicative of an ordinary frame (set to "0*"), a file mark frame (set to "1*"), valid data (set to "*0"), or invalid data (set to "*1"). The lower four bits of the second word is set to the number (PFL) of frames of the error correcting code in a binary code. The third word is set to the total number (ECFL) of data signal frames and error correcting code frames in a binary code, all the bits of which are set to "0" if the number of frames is indefinite.

The fourth word is assigned to the number (EFNO) area of frames to which the error correcting code has been added. When the first or most significant bit thereof is set to "0", it indicates that the concerned frame is a data signal frame and the subsequent seven bits thereof are set to a binary-code combination indicative of the serial number of the data signal frame. On the contrary, if the first bit is set to "1", it indicates that the concerned frame is an error correcting code frame and the subsequent seven bits thereof are set to a binary-code combination indicative of the serial number of the error correcting code frame.

The first or most significant bit of the fifth word is a flag (F1) which indicates whether signals of the subcode area are recorded also in the data area (set to "1") or not (set to "0"). The next two bits of the fifth word are set to a binary-code combination indicative of a file mark order (#FM). The lower five bits of the fifth word and the sixth word are assigned to indicate the number (EBL) area of bytes of valid data in a frame and set to a binary-code combination indicating the number of bytes.

The upper four bits of the second word and the seventh word are reserved as extended bits and all set to "0" at the moment. The eighth word is assigned to a parity for the first to seventh words.

Thus, the data signals can be quite smoothly reproduced by identifying these ID codes and so on as described above.

It is therefore possible to use the DAT as a data recorder, wherein the rotary drum 11 is rotated, for example, at 2000 rpm, so that data is quite rapidly recorded at a rate of 192,000 bytes per second and consequently the consumption of the recording medium can be largely reduced. Moreover, the data can be smoothly recorded with the error correcting code added thereto, which permits a satisfactory data recording.

According to the second embodiment as described above, since the frame of the error correcting code added to data and so on are included in the DAT format, it is possible to generate the error correcting code for an arbitrary length of data sequence and thereby smoothly record the arbitrary length of the data sequence, whereby a satisfactory data recorder which employs the DAT can be provided.

The above description is given on preferred embodiments of the invention but it will be apparent that many modifications and variations could be effected by one skilled in the art without departing from the spirit or scope of the novel concepts of the invention so that the scope of the invention should be determined by the appended claims only.

We claim as our invention:

1. An apparatus for recording digital data information on a recording medium, comprising:
   (a) recording means for recording inputted digital signals in separate frames, each one of which is made up of two oblique tracks; and
   (b) control means for dividing said inputted digital data information into N frames, where N is an integer, interspersing between each such N frames of inputted digital data information a predetermined number of frames of non-inputted digital data information, and supplying the divided inputted digital data information and non-inputted digital information to said recording means whereby between every N frames of recorded inputted digital data information there are a predetermined number of frames of recorded non-inputted digital information.

2. An apparatus for recording digital data information on a recording medium as claimed in claim 1, wherein said control means comprise means for supplying a predetermined number of frames of a dummy signal as non-inputted digital information to said recording means between each N frames of inputted digital data information.

3. An apparatus for recording digital data information on a recording medium as claimed in claim 1, wherein said control means comprise means for generating a predetermined number of frames of an error correcting code for each group of said N frames of the digital data information; and means for supplying said error correcting code as non-inputted digital information to said recording means between each N frames of inputted digital data information.

4. An apparatus for recording digital data information on a recording medium as claimed in claim 3, further comprising means for recording separate discriminating signals for discriminating each frame in which said digital data information is recorded and each frame in which said error correcting code is recorded.

5. An apparatus for recording digital data information on a recording medium as claimed in claim 4, wherein each of said discriminating signals is recorded in a sub-area of the recording medium different from a main area of the recording medium in which said digital data information is recorded.

6. An apparatus for recording digital data information on a recording medium as claimed in claim 4, further comprising:
   reproducing means for reproducing digital signals and said discriminating signal recorded in the oblique tracks;
   first error correcting means for correcting errors in the reproduced digital signals;
   means for generating a syndrome for correcting errors on the basis of said reproduced discriminating signal;
   means for halting the output of the reproduced digital signals when an error which cannot be corrected by said first error correcting means occurs in said reproduced digital signal;
   means for reproducing recorded digital signals again after said syndrome has been generated; and
   outputting means for correcting said error occurring in said digital signal by said syndrome and for outputting said digital signal free of said error as digital data information.

* * * * *